Figure 1:
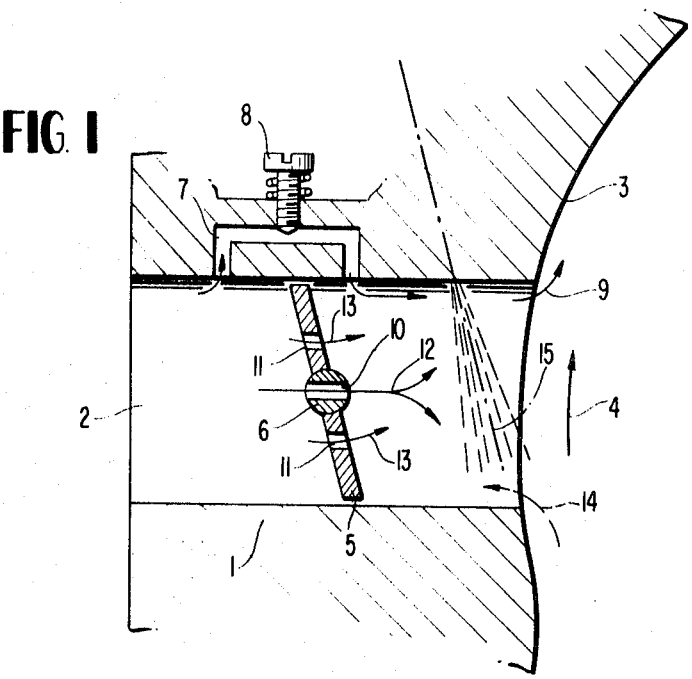

United States Patent

[11] 3,620,195

[72] Inventor Heinz Lamm
    Esslingen-St. Bernhardt, Germany
[21] Appl. No. 875,647
[22] Filed Nov. 12, 1969
[45] Patented Nov. 16, 1971
[73] Assignee Daimler-Benz Aktiengesellschaft
    Stuttgart-Unterturkheim, Germany
[32] Priority Nov. 13, 1968
[33] Germany
[31] P 18 08 632.3

[54] ROTARY PISTON INJECTION-TYPE INTERNAL COMBUSTION ENGINE
    20 Claims, 2 Drawing Figs.
[52] U.S. Cl. .................................... 123/8.13,
    123/139 BG, 123/140 MP
[51] Int. Cl. ..................................... F02b 53/06
[50] Field of Search .......................... 418/61;
    123/8.09, 8.11, 8.45, 119 D, 139.18, 140.2, 8.13,
    139 BG, 140 MP

[56] References Cited
    UNITED STATES PATENTS
    2,093,984  9/1937  Schweizer ............... 123/140.2
    2,667,153  1/1954  Bensinger ............... 123/140.2
    2,751,897  6/1956  Schweizer et al. ...... 123/140.2
    2,929,370  3/1960  Staege ................... 123/139.18
    3,103,211  9/1963  Cameron ............... 123/140.2
    3,347,213 10/1967  Froede .................. 123/8.45
    3,456,623  7/1969  Weigert et al. ......... 123/8.45

Primary Examiner—Carlton R. Croyle
Assistant Examiner—Wilbur J. Goodlin
Attorney—Craig, Antonelli & Hill ABSTRACT: A rotary piston injection-type internal combustion engine, especially of trochoidal type of construction in which a throttle valve mounted on a throttle valve shaft is arranged in the inlet channel to control the amount of combustion air flowing through the inlet channel; the throttle valve and/or the throttle valve shaft are provided with one or several bores for the flow of combustion air through the same when the throttle valve is in the closed or partially open position.

INVENTOR
HEINZ LAMM

ROTARY PISTON INJECTION-TYPE INTERNAL COMBUSTION ENGINE

The present invention relates to a rotary piston injection-type internal combustion engine of especially trochoidal-type of construction with a control member arranged in the inlet channel which controls the quantity of combustion air, and with an idling channel bypassing this control member and having a regulating mechanism.

With internal combustion engines of this type, a homogeneous mixture formation is not possible with a closed control member because the entry of the combustion air through the idling air channel downstream of the control member takes place only unilaterally, i.e., on one side. As a result of the one-sided air-entry, air filament streams move in the inlet channel toward the suction space along the side facing the direction of rotation which are seized only slightly by the fuel independently of the type of the injection. On the side of the inlet channel opposite the direction of rotation, exhaust gases are sucked over from the expansion space. This exhaust gas fills a portion of the inlet channel and absorbs with an injection into the suction channel the largest portion of the fuel. Several layers result therefrom in the inlet channel which flow into the suction space unmixed with one another so that later on during the ignition also no ignitable mixture is present in proximity to the spark plug.

The present invention aims at eliminating the described shortcomings with simple means. The underlying problems are solved in accordance with the present invention in that at least one bore is present in the control member within the inlet channel which is disposed in the direction of the inlet channel with a closed control member.

The bore or the several bores provided in the control member assume for the largest part the supply of the quantity of combustion air necessary for the maintenance of the idling of the internal combustion engine. A regulation of the entire idling quantity takes place by the regulation of the quantity flowing through the idling channel. A matching of the air quantities from disk to disk also takes place thereby with internal combustion engines of multidisk construction in order to compensate from an air point of view, differences in the idling rotational speed conditioned by differing gas tightness. One succeeds by the bores in the control member to feed the largest portion of the idling quantity of combustion air centrally into the inlet channel, to create a strong turbulence downstream of the control member and assure thereby a good mixing of that part of the idling air quantity with the fuel. The exhaust gas entering the inlet channel from the exhaust channel side is prevented by this turbulence to enter into the inlet channel in the heretofore customary manner so that a considerably larger ignitable mixture fills the inlet channel cross section. Consequently, a more ignitable mixture is also disposed in front of the spark plug at the ignition moment, the idling operation becomes failure-free and is steady.

Insofar as a throttle valve seated on a throttle valve shaft is arranged in the inlet channel as control member, one or several bores may be arranged in the throttle valve shaft. However, they may also be provided in the throttle valve either alone or additionally whereby the bores are arranged advantageously in proximity to the center longitudinal axis through the inlet channel.

The construction of the bores may be made in such a manner that the entire cross section of all bores is so dimensioned that in relation to the combustion air flowing through the idling air channel, the largest portion, for example, 80 percent of the entire idling quantity in combustion air flows through the bores. The number of bores and their diameter determine primarily also the rotational speed value, for example, $n = 600$ r.p.m.

The bores in the throttle valve shaft and/or in the throttle valve have additionally the advantage that in the partial load range, when the throttle valve is slightly opened, they improve the mixture formation so that one is able to drive more economically at smaller driving power. With slightly opened throttle valve, a high air velocity prevails in the two sickle-shaped spaces thus opening between the throttle valve and the inlet channel. Vacuum results therefrom downstream of the throttle valve, particularly in the channel center. However, additional air now still blows through the bores in this area so that a strong turbulence occurs which seizes the entire inlet cross section. The mixture formation can therefore be brought to an optimum, and the exhaust gas proportion becomes smaller in the channel. Additionally, the stratification in the channel is eliminated and the fuel-air mixture becomes more homogeneous and more ignitable. With increasing opening of the throttle valve, the indicated effect is needed increasingly less because the vacuum in the inlet channel becomes smaller. Thus, also the air quantity flowing through the bores decreases, particularly with fully opened throttle valve the bores are disposed transversely to the flow.

Accordingly, it is an object of the present invention to provide a rotary piston injection internal combustion engine of the type described above which eliminates by simple means the aforementioned shortcomings and drawbacks encountered in the prior art.

Another object of the present invention resides in a rotary piston injection-type internal combustion engine which assures a homogeneous mixture formation even during idling speeds and low partial loads.

A further object of the present invention resides in a rotary piston internal combustion engine especially of trochoidal construction in which an ignitable mixture is present at the ignition instant in proximity to the spark plug under all load conditions.

Figure 2:
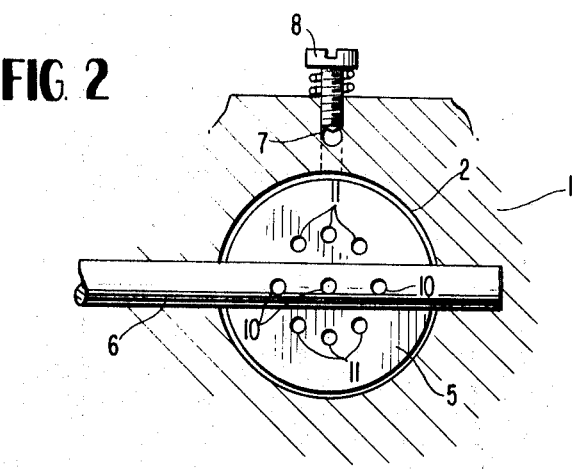

Still another object of the present invention resides in a rotary piston internal combustion engine which also permits an equalization of the idling speeds in multidisk-type constructions. These and other objects, features, and advantages of the present invention will become more obvious from the following description when taken in connection with the accompanying drawing which shows, for purposes of illustration only, one embodiment in accordance with the present invention, and wherein:

FIG. 1 is a partial longitudinal cross-sectional view through an inlet channel of a rotary piston internal combustion engine of the injection type in accordance with the present invention; and FIG. 2 is a partial transverse cross-sectional view through the inlet channel of FIG. 1.

Referring now to the drawing wherein like reference numerals are used throughout the two views to designate like parts, reference numeral 1 designates a housing casing of a conventional rotary piston injection-type internal combustion engine of trochoidal construction in which is arranged the inlet channel 2. Since the rotary piston internal combustion engine of trochoidal construction is known as such, a detailed description and showing of the various parts is dispensed with herein. The discharge of the inlet channel 2 is disposed in the contact or cam surface 3 for the piston (not shown) rotating in the direction of arrow 4. The throttle valve 5 is arranged in the inlet channel 2 which is securely connected with the throttle valve shaft 6 rotatably supported in the housing casing 1. Additionally, the idling channel 7 is provided in the casing 1 which has its inlet cross section in the wall of the inlet channel 2 upstream of the closed throttle valve 5 and whose discharge in this wall is disposed downstream of the closed throttle valve 5. The cross section of the idling channel 7 can be increased or decreased by means of a regulating screw 8 for the adjustment of the respectively necessary idling air quantity.

In order to prevent that with a closed throttle valve 5, the idling air flows into the suction space of the internal combustion engine in the direction of arrow 9 practically along the wall of the inlet channel 2 and only at the parts of the wall disposed in the direction of rotation 4 of the piston, whereby the disadvantages described above occur, the throttle valve shaft 6 is provided with bores 10 and the throttle valve 5 with bores 11. These bores 10, 11 are so arranged that with a closed throttle valve 5, they are disposed in the longitudinal direction of the inlet channel 2. Additionally, they are arranged centrally to the inlet channel 2. The entire cross section of all bores 10, 11 is so dimensioned that about 80 percent of the necessary idling air quantity flows in the direction of arrows 12, 13 through the bores 10, 11. The idling channel 7 is so throttled by means of the regulating screw 8 that only about 20 percent of the entire idling air quantity flows through the idling channel 7. The idling channel 7 together with the regulating screw 8 serves primarily only for the matching of the idling air quantities from disk to disk in multidisk internal combustion engines.

As a result of the arrangement of the bores 10 and 11, there is present, in addition to the idling air flowing in the direction of arrow 9, a central airstream. The idling air flowing in the direction of arrows 12, 13, forms downstream of the throttle valve 5 a strong turbulence so that exhaust gases cannot enter into the inlet channel 2 from the expansion side of the internal combustion engine in the direction of arrow 14.

In the event that the fuel injection takes place into the inlet channel 2 and the fuel jet assumes approximately the direction indicated by reference numeral 15, a particularly intimate mixing of the fuel with combustion air takes place.

If the throttle 5 is opened a little, air blows through the bores 10, 11 into the vacuum area behind or downstream of the throttle valve so that a strong turbulence occurs thereat which encompasses the entire cross section of the inlet channel 2.

With increasing opening of the throttle valve 5, the effect of the bores 10, 11 becomes lost at a moment when this effect is no longer needed. The bores, however, are then disposed transversely to the flow direction.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A rotary piston injection-type internal combustion engine of trochoidal construction with an inlet channel adjoining an exhaust channel within the casing in the direction of normal rotation of a polygonal piston and with a control means arranged in the inlet channel and controlling the quantity of combustion air and provided with an idling channel means bypassing said control means and accommodating the flow of a portion of the combustion air during normal operation of the engine in the forward direction, characterized in that at least one bore is provided in the control means which is open in both directions of flow and which is disposed substantially in the direction of the inlet channel means with a closed control means to provide a turbulence of air downstream of the closed control means offsetting the stratification otherwise produced by the air flowing through the idling channel means and by the exhaust gases overflowing into the inlet channel from the outlet channel.

2. A rotary piston internal combustion engine according to claim 1, characterized in that said idling channel means includes regulating means.

3. A rotary piston internal combustion engine of trochoidal construction with fuel injection, which includes a housing casing with an inlet channel and an exhaust channel and a control means arranged in the inlet channel and controlling the quantity of combustion air and provided with an idling channel means bypassing said control means, characterized in that at least one bore is provided in the control means which is disposed substantially in the direction of the inlet channel means with a closed control means, and in that said idling channel means includes regulating means for adjusting the amount of idling air flowing therethrough in addition to the idling air flowing through said bore whereby a strong turbulence downstream of the control means is produced.

4. An internal combustion engine according to claim 3, with a throttle valve arranged on a throttle valve shaft as control means, characterized in that at least one bore is arranged in one of the two parts consisting of the throttle valve and the throttle valve shaft.

5. An internal combustion engine according to claim 4, characterized in that at least one bore is arranged in the throttle valve shaft.

6. An internal combustion engine according to claim 5, characterized in that several bores are provided in the throttle valve shaft.

7. An internal combustion engine according to claim 4, characterized in that at least one bore is provided in the throttle valve.

8. An internal combustion engine according to claim 7, characterized in that several bores are provided in the throttle valve.

9. An internal combustion engine according to claim 8, characterized in that at least one bore is arranged in the throttle valve shaft.

10. An internal combustion engine according to claim 8, characterized in that several bores are provided in the throttle valve shaft.

11. An internal combustion engine according to claim 10, characterized in that the bores are arranged in proximity to the center longitudinal axis through the inlet channel means.

12. An internal combustion engine according to claim 11, characterized in that the entire cross section of all bores is so dimensioned that in relation to the combustion air flowing through the idling channel means, the largest portion of combustion air flows through the bores.

13. An internal combustion engine according to claim 12, wherein the proportion of combustion air flowing through the bores is of the order of 80 percent of the entire idling quantity.

14. An internal combustion engine according to claim 4, characterized in that the bores are arranged in proximity to the center longitudinal axis through the inlet channel means.

15. An internal combustion engine according to claim 4, characterized in that the entire cross section of all bores is so dimensioned that in relation to the combustion air flowing through the idling channel means, the largest portion of combustion air flows through the bores.

16. An internal combustion engine according to claim 15, wherein the proportion of combustion air flowing through the bores is of the order of 80 percent of the entire idling quantity.

17. An internal combustion engine according to claim 1, characterized by fuel injection means injecting fuel into the inlet channel downstream of the control means.

18. An internal combustion engine according to claim 17, characterized in that said fuel is injected substantially transversely to the axis of the inlet channel and in a direction substantially opposite to the direction of rotation of a piston rotating within the housing casing.

19. An internal combustion engine according to claim 1, characterized by fuel injection means for injecting fuel into the air turbulence downstream of the control means in said inlet channel.

20. An internal combustion engine according to claim 19, wherein the fuel is injected substantially transversely to the axis of the inlet channel and in a direction substantially opposite to the direction of rotation of a piston rotating within said housing casing.

* * * * *